United States Patent [19]
Allen et al.

[11] Patent Number: 5,145,689
[45] Date of Patent: Sep. 8, 1992

[54] MELTBLOWING DIE

[75] Inventors: Martin A. Allen; John T. Fetcko, both of Dawsonville, Ga.

[73] Assignee: Exxon Chemical Patents Inc., Linden, N.J.

[21] Appl. No.: 599,006

[22] Filed: Oct. 17, 1990

[51] Int. Cl.$^5$ .................. B29C 47/12; D01D 5/14
[52] U.S. Cl. .......................... 425/72.2; 425/7; 425/145; 425/382.2; 425/463; 425/464
[58] Field of Search .............. 264/12; 425/7, 66, 72.2, 425/80.1, 145, 192 S, 382.2, 382.4, 461, 463, 464; 239/557, 562

[56] References Cited

U.S. PATENT DOCUMENTS

| | | | |
|---|---|---|---|
| 3,488,806 | 1/1970 | De Cecco et al. | 425/463 |
| 3,970,417 | 7/1976 | Page | 425/72.2 |
| 4,050,866 | 9/1977 | Kilsdonk | 425/463 |
| 4,645,444 | 2/1987 | Lenk et al. | 425/464 |
| 4,708,619 | 11/1987 | Balk | 425/382.2 |
| 4,785,996 | 11/1988 | Ziecker et al. | 425/7 |
| 4,818,463 | 4/1989 | Buehning | 425/72.2 |
| 4,923,706 | 5/1990 | Binley et al. | 425/464 |
| 4,983,109 | 1/1991 | Miller et al. | 425/192 S |

FOREIGN PATENT DOCUMENTS

| | | | |
|---|---|---|---|
| 93358 | 11/1983 | European Pat. Off. | 425/464 |
| 2248757 | 4/1974 | Fed. Rep. of Germany | 425/382.2 |

Primary Examiner—Jay H. Woo
Assistant Examiner—James P. Mackey
Attorney, Agent, or Firm—R. L. Graham

[57] ABSTRACT

A meltblowing die assembly features (a) intermittent operation, (b) modular valve actuator to selectively shut off polymer flow, (c) an in-line electric heater, and (d) meltblowing units arranged in side-by-side relationship.

5 Claims, 6 Drawing Sheets

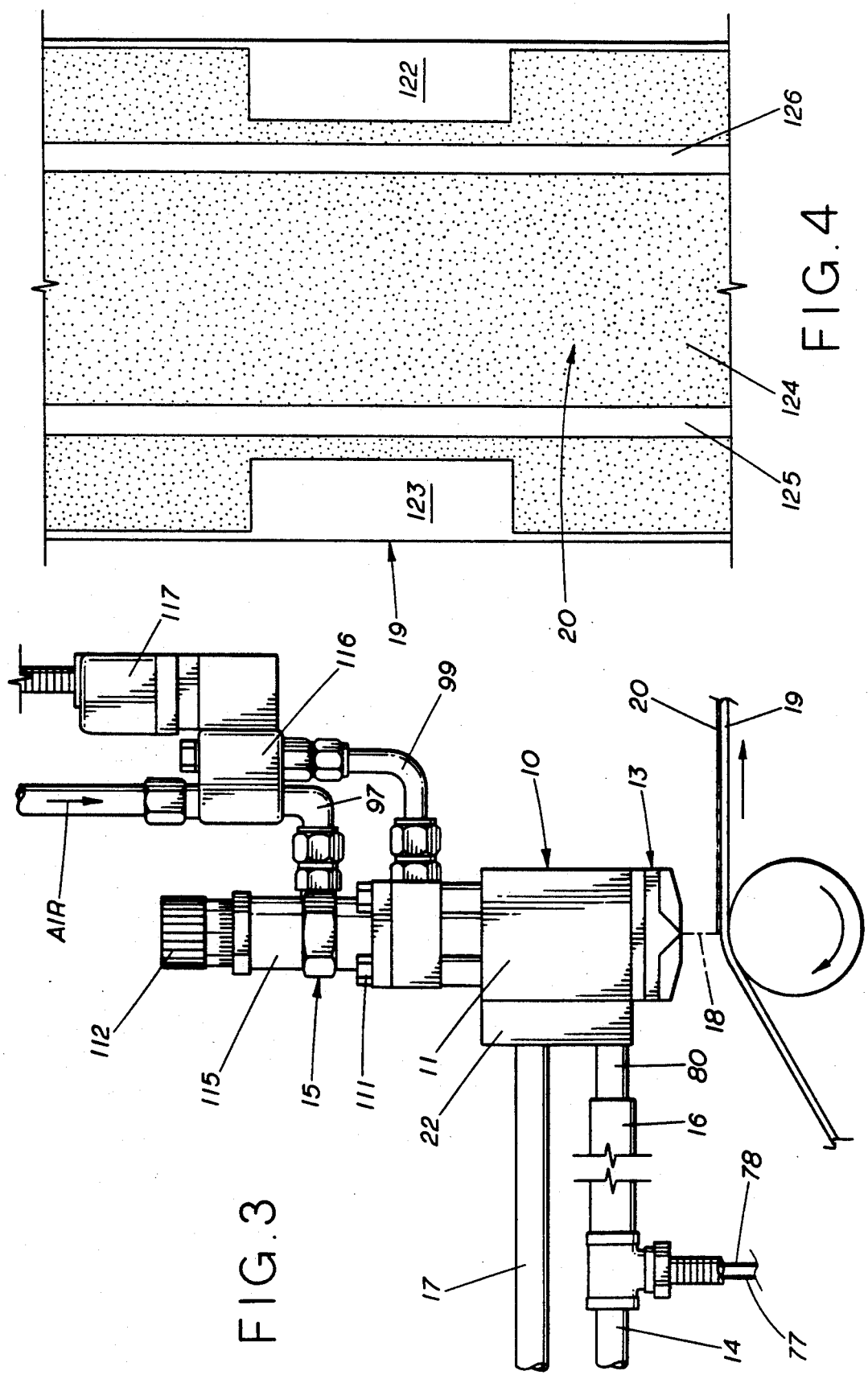

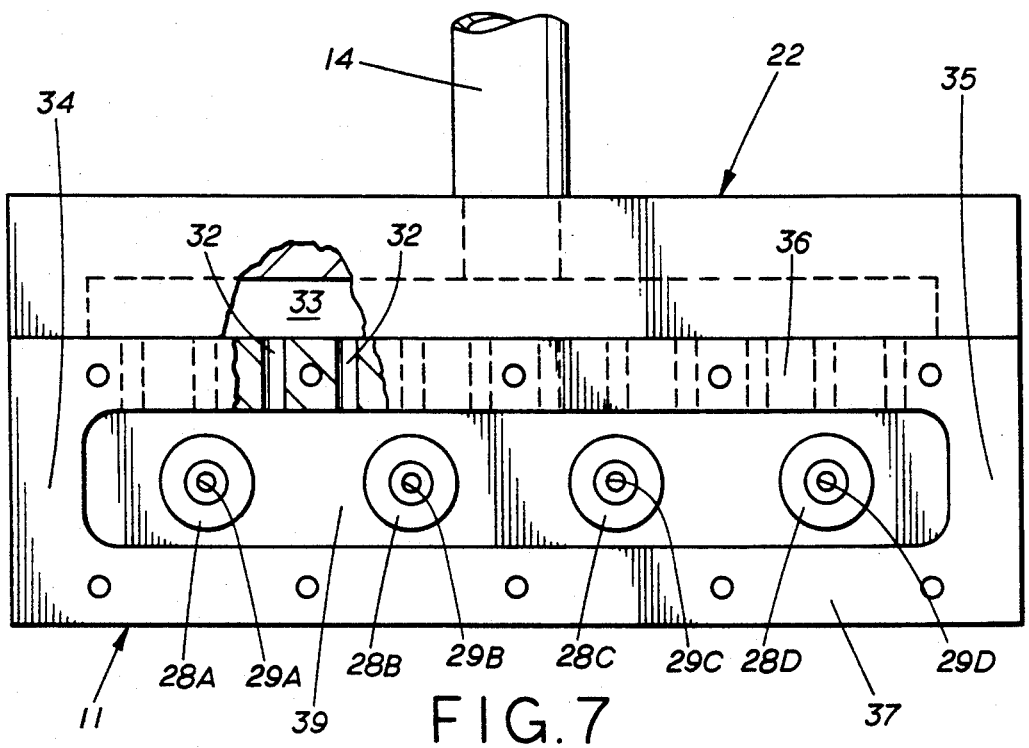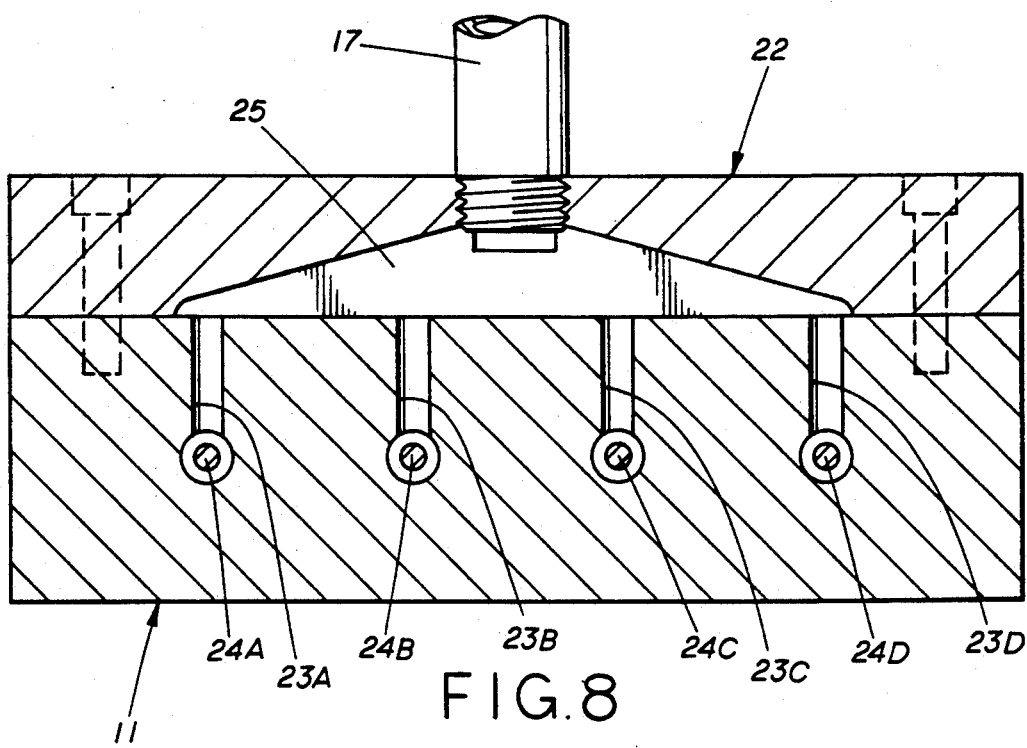

MELTBLOWING DIE

BACKGROUND OF THE INVENTION

This invention relates generally to meltblowing and in particular to improved meltblowing dies. In one aspect the invention relates to a modular die construction featuring intermittent operation of individual modules thereby permitting the application of meltblown material in a predetermined pattern. In another aspect, the invention relates to an improved heater/meltblowing die assembly. In a specific aspect, the invention relates to a method of applying an adhesive or web to a diaper film.

Meltblowing is a process in which high velocity hot air (normally referred to as "primary air") is used to blow molten fibers extruded from a die onto a collector to form a web or onto a substrate to form a coating or composite. The process employs a die provided with (a) a plurality of orifices formed in a tip of a triangular shaped die tip and (b) flanking air passages. As extruded strands of the polymer melt emerges from the orifices, the converging high velocity hot air from the air passages stretches and draws them down by drag forces forming microsized filaments.

The filaments are drawndown to their final diameter of 0.5 to 20 microns (avg.) in the case of polyolefin polymers such as polypropylene and to 10 to 200 microns in the case of polymers used in adhesives and spray coating. The strands extruded from the die may be continuous or discontinuous fibers. For the purpose of the present description, the term "filament" refers to both the continuous and discontinuous strands.

The meltblowing process grew out of laboratory research by the Naval Research Laboratory which was published in Naval Research Laboratory Report 4364 "Manufacture of Superfine Organic Fibers", Apr. 15, 1954. Exxon Chemical developed a variety of commercial meltblowing dies, processes, and end-use products as evidenced by U.S. Pat. Nos. 3,650,866, 3,704,198, 3,755,527, 3,825,379, 3,849,241, 3,947,537 and 3,978,185, to name but a few. Other die designs were developed by Beloit and Kimberly Clark. Representative meltblowing patents of these two companies include U.S. Pat. Nos. 3,942,723, 4,100,324 and 4,526,733. Recent meltblowing die improvements are disclosed in U.S. Pat. Nos. 4,818,463 and 4,889,476.

A key component in the meltblowing die assembly is the die tip which is a machined steel member having a triangular nosepiece through which the orifices are formed. In the die assembly, air passages are formed on opposite sides of the converging triangular nose piece, meeting at the apex where the polymer melt emerges from the orifices. Most of the melt blowing prior art dies employ a long die tip (typically from 10 to 120 inches and longer) having evenly-spaced, side-by-side orifices. In order to provide the desired air drag forces by the primary air on the filaments, the included angle of the nosepiece (which determines the direction of the air flow has been about 60° so that the primary air has a major velocity component parallel to filament spinning.

Also, the meltblowing die assemblies are operated continuously. Interrupting polymer flow presents two problems: (a) polymer continues to dribble out of the polymer orifices, and (b) the air tends to aspirate polymer from the die tips causing undesired afterflow. At the present, when a meltblowing die is shut down, it continues to flow out polymer until the residual polymer in the distribution manifold, the screen pack section and the die tip has emptied itself due to gravitational and aspirational forces. This can be as much as 5 lbs. of melt for conventional dies.

Another feature common to most, if not all, meltblowing dies is the air heating system. Energy used to heat the air is one of the most expensive operational items of meltblowing systems. Generally, the air is compressed and flowed through a furnace and conducted through large insulated conduits to air distribution manifolds on the die assembly. The use of a single furnace for the system not only presents problems in design (because large space must be provided to house the furnace and large conduits) but it also is energy inefficient (because of thermal loss between the furnace and the die assembly). Even small improvements in thermal efficiency can produce large savings in energy costs.

Summarizing the state of prior meltblowing dies, there is a need (a) to provide intermittent polymer discharge from the dies, and (b) to improve the air heater facilities.

SUMMARY OF THE INVENTION

The present invention provides a die assembly which features (a) intermittent operation for controlled meltblowing polymer deposition, (b) a modular meltblowing die assembly, (c) an improved air heating system, and (d) a plurality of separate meltblowing die units operable in parallel to permit the use of different resins or different patterns.

A novel feature of the meltblowing die constructed according to the present invention is its internal valve with external actuator. By programming the valve actuator, the valve can be opened or closed to control the flow of polymer melt through the die. It has been discovered that by designing the polymer flow passage to limit the volume of polymer melt between the valve and the die outlet, the polymer flow can be interrupted, or shut off, with none or only negligible polymer afterflow or dribbling, even with continued operation of the meltblowing air. In a preferred embodiment, the valve in the die includes a valve seat and a stem having one end sized to mate with valve seat and the other end operatively connected to the valve actuator. The valve seat and stem end are designed to create a pressure or rate pulse attendant to actuation of the stem. The high pulse flow through the die aids in removing or preventing the buildup of polymer residue on or in the orifices.

In another embodiment of the invention, the die comprises a series of side-by-side melt blowing units which are separately and independently operable (except for the air flow). The units may be fed with separate resin or operated under different conditions (e.g. flow rate) to produce a variety of patterns. When the die assembly is provided with internal valves, each valve (one for each unit) is operatively connected to a modular valve actuator. The valve actuators may be programmed to interrupt the flow of polymer through certain units while continuing polymer flow through other units. This selectively is particularly useful in applying adhesives or polymer melt to a substrate of predetermined shape (e.g. diaper backsheet).

Still another novel feature of the present invention is the in-line electric heater connected directly to the die assembly for heating the air. The high-efficiency electric heater permits the use of much smaller diameter air feed lines. Moreover, the feed lines need not be insulated. Perhaps most important, radiant heat losses are minimized since the air is heated immediately upstream of the die assembly.

BRIEF DESCRIPTION OF THE DRAWINGS

FIG. 3 is a side elevational view of the die assembly shown in FIG. 1 showing details thereof.

FIG. 4 is a top plan view of one pattern of product made by the die assembly of FIG. 1.

FIG. 7 is a sectional view of the assembly shown in FIG. 5 with the cutting plane taken along line 7—7 thereof.

FIG. 8 is a sectional view of the die assembly shown in FIG. 5 with the cutting plane taken along line 8—8 thereof.

DESCRIPTION OF THE PREFERRED EMBODIMENTS

Figures 1, 2:
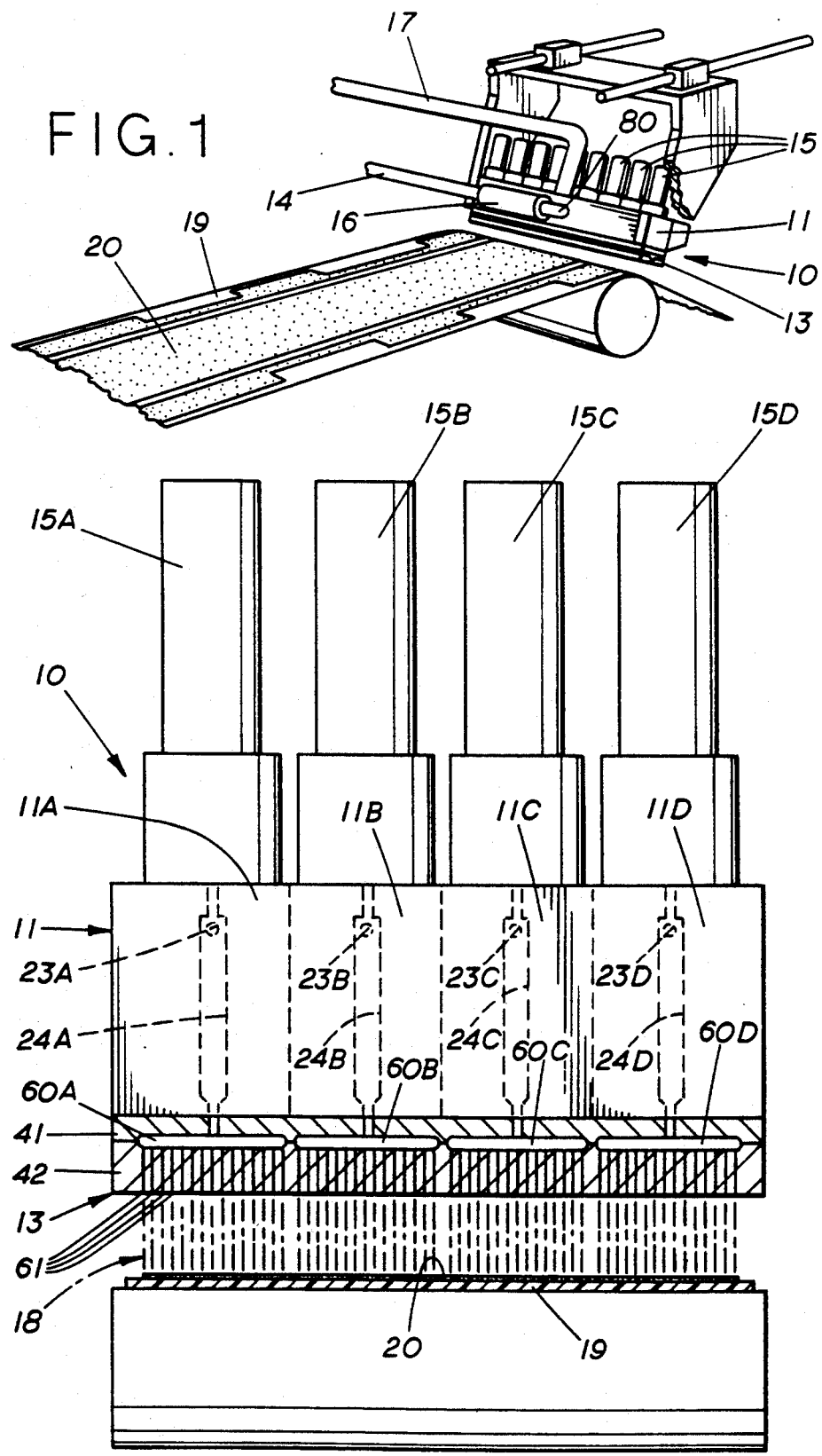
FIG. 1 is a perspective view illustrating a die assembly constructed according to the present invention.
FIG. 2 is a front elevational view of a die assembly constructed according to the present invention, with portions cut away.

With reference to FIGS. 1-3 and 5, a die assembly 10 of the present invention comprises a die body 11, valve assembly 12 comprising a plurality of valve actuators 15 (shown as 15A-15D in FIG. 2), die tip assembly 13, air delivery line 14 including in-line air heater 16 and polymer delivery line 17.

As will be described in detail below, polymer melt is delivered to body 11 and extruded through orifices in the die tip 13 forming filaments (or fibers) 18. Hot air is delivered to each side of the row of filaments 18 to stretch and attenuate the filaments. The filaments 18 are deposited on a suitable substrate 19 or collector, such as a rotating screen or conveyor. Operation of the valve assembly 12 provides for selective intermittent polymer flow so that various patterns may be formed and collected on the substrate or collector 19. The form and type of pattern may be varied by programming the valve operation.

When using small orifices (typically in the size range of 0.010" to 0.020" for meltblowing polymers) the collection of microsized filaments may be in the form of a nonwoven web. When the die assembly 10 is operated to meltblown adhesive polymers, the collection may be as an adhesive layer 20 on substrate 19 as illustrated in FIG. 1. The die assembly 10 may also be used in other meltblowing polymer applications such as coating. Other collection devices such as filter cylinders, composites, etc. are possible.

Details of the present invention will be described with reference to its four main components: (1) die body 11, (2) valve assembly 12, (3) die tip assembly 13, and (4) air heater 16.

Die Body (FIGS. 2, 5, 7, and 8)

As shown in FIG. 2, the die body 11 is a relatively large, elongate steel body which supports the other components. Although integral in structure, the body 11 may be viewed as a plurality of separate functional units 11A, 11B, 11C, and 11D, each unit being independent of the other units. The embodiment illustrated in FIG. 1 contains four side-by-side units 11A-11D, but is should be emphasized that the body may consist of from 1 to 100 units. Note that FIG. 1 discloses a die assembly 10 comprising 9 actuators 15 which means the die body 11 is provided with 9 units.

Only one (unit 11A) of the units 11A-11D will be described in detail, it being understood that the polymer and air passages formed in all of the units 11A-11D will be generally the same. The description with reference to FIGS. 5 and 6 of Unit 11A and its associated actuator 15A will be without letter designation. However, each of the other units 11B-15D will have corresponding parts. The description with reference to Figures depicting more than one unit will include the letter designation to denote the separate units.

Figure 5:
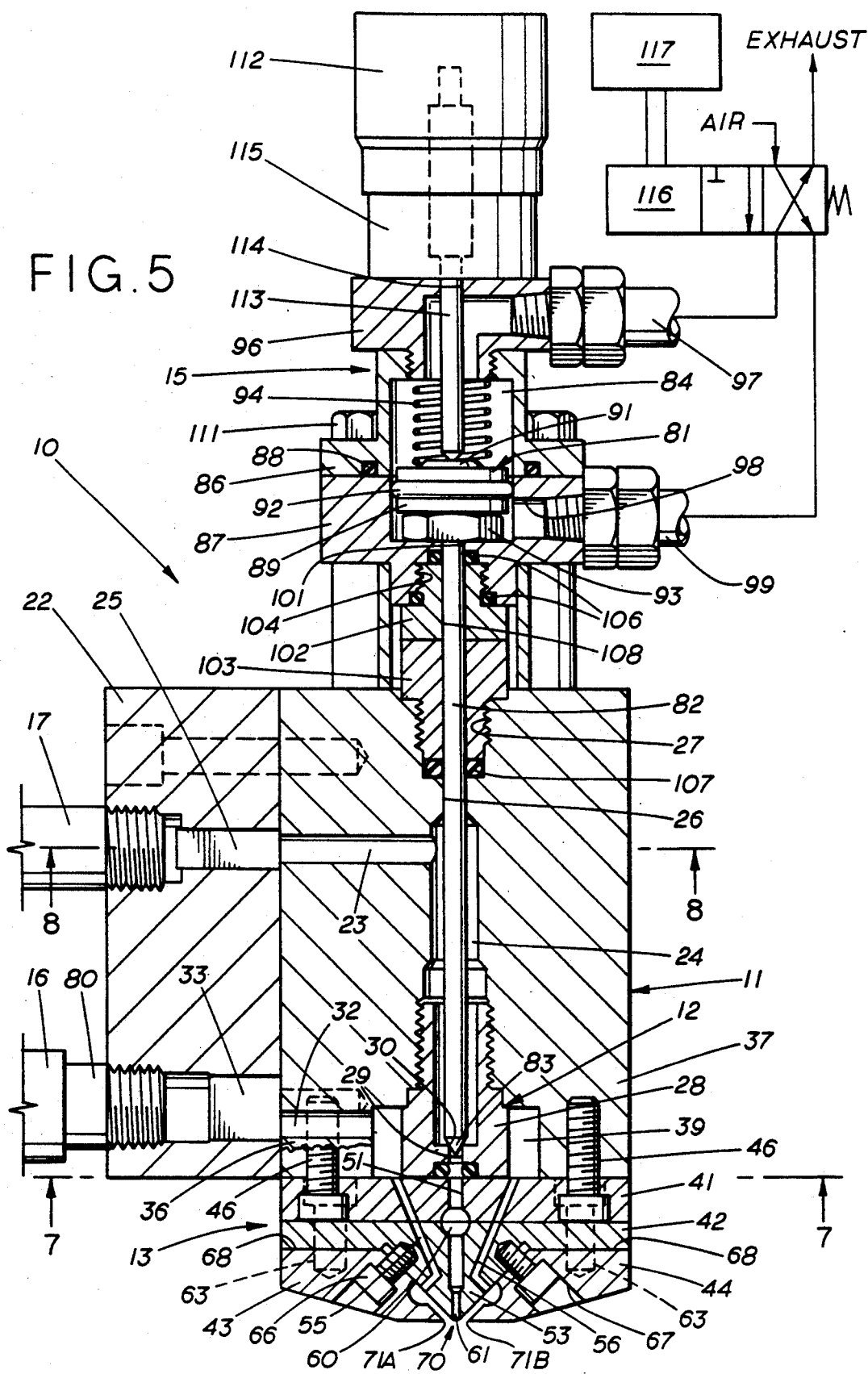
FIG. 5 is a sectional view of the assembly shown in FIG. 3 illustrating internal details thereof.

Referring first to FIG. 5, die body 11 has formed therein intersecting polymer passages 23 and 24. Passage 23 connects to polymer feed line 17 through header manifold 22, and passage 24 is vertically aligned with valve actuator 15 and die tip assembly 13. In FIG. 1, the polymers feed line 17 is illustrated as entering manifold 22 from the vertical. (For simplicity of description, the feed line 17 in FIGS. 3, 5, and 7 is illustrated as entering manifold 22 in the horizontal.) Also formed in die body 11 is an opening 26 extending upwardly from passage 24 and terminating in threaded counterbore 27.

The lower end of passage 24 is threaded for receiving insert 28 having port 29 formed therein. The inlet to port 29 is shaped to provide a valve seat 30, as described in detail below.

As best seen in FIG. 8, each polymer passage 23A-D is fed by a manifold 22 having a balancing header 25 in the form of a clothes hanger spanning the four inlets of passages 23A-23D. Returning to FIG. 5, polymer flow through the body 11 is from line 17, through header 25, through flow passages 23 and 24 of each unit in parallel flow pattern, discharging through port 29 of each unit. The flow through each unit preferably is at the same rate.

As shown in FIG. 7, the bottom side of die body 11 has a machined out section which defines elongate air chamber 39. The circular inserts 28A-28D mounted on the die body 11 as previously described separate the air chamber 39 from polymer flow passages. The air chamber 39 defined by end walls 34, 35 and side walls 36, 37 is continuous throughout the die body 11 and surrounds the unit inserts 28A-28D.

Referring to FIGS. 5 and 7, a plurality of air passages 32 extend through die body 11 into chamber 39. The air passages 32 are distributed along wall 36 of the die body 11 to provide generally uniform flow of air into chamber 39. Air is fed by header 33 which may be formed in block 22.

The electric in-line heater 16 is connected to the inlet of air block immediately upstream of header 33. Air thus flows from air line 14 through heater 16, through air header 33, through air passages 32, in parallel flow, into chamber 39.

Figure 10:
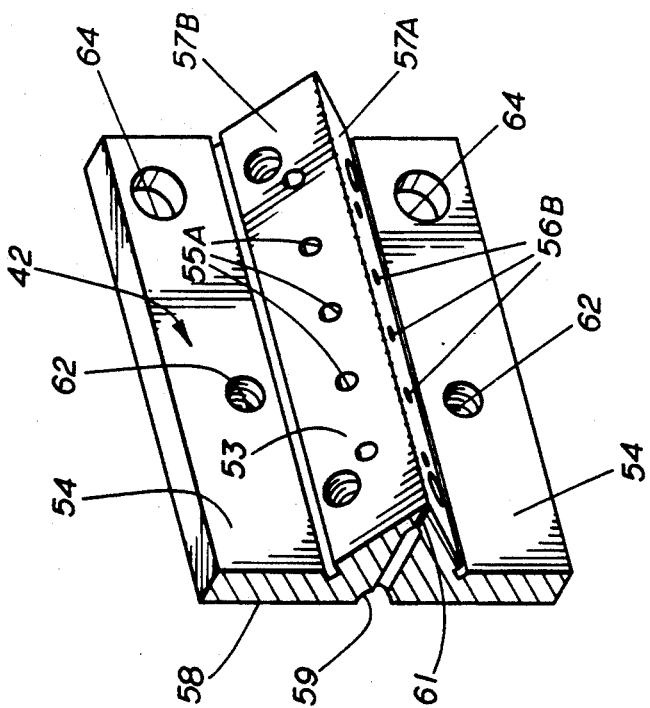
FIG. 10 is a perspective sectional, sectional view of the die tip shown in assembly of FIGS. 1-3, 5, and 6.
Figure 6:
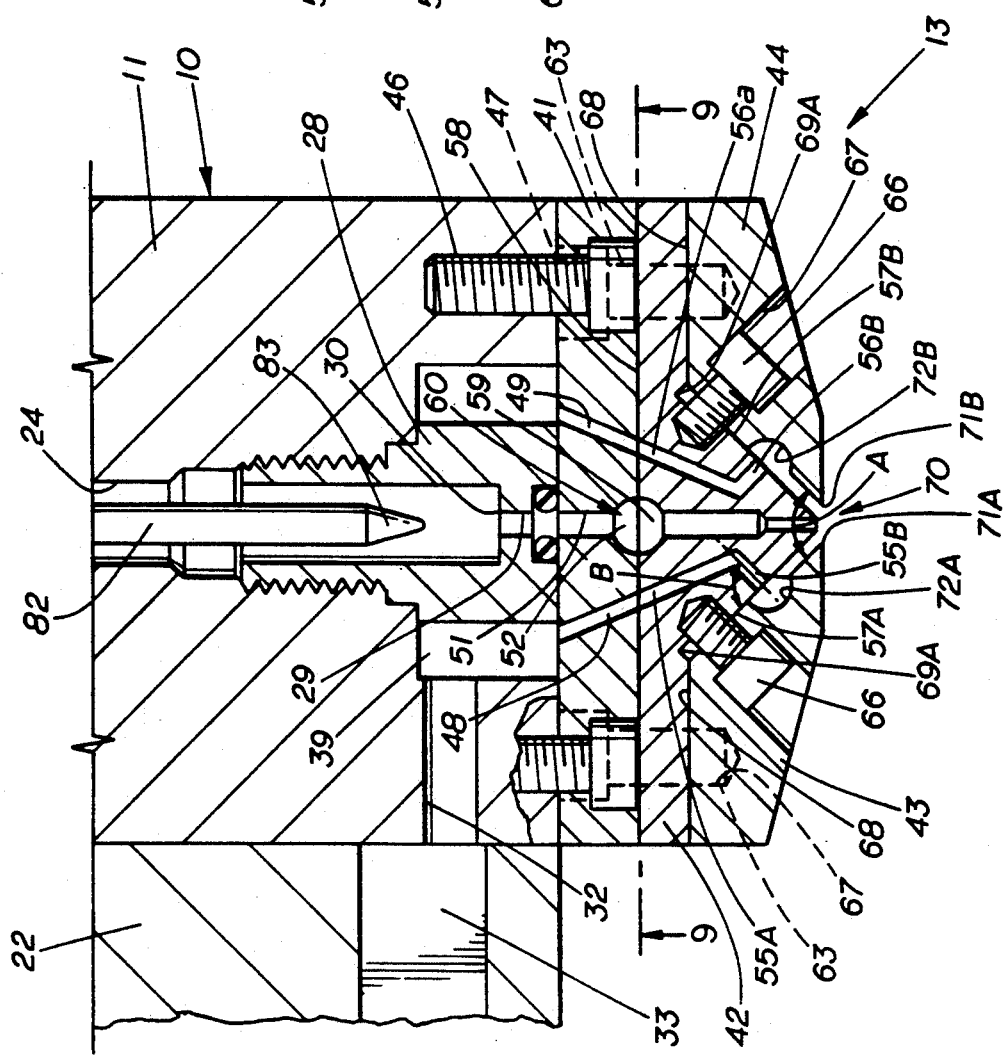
FIG. 6 is an enlarged view of the die tip shown in FIG. 5.
Figure 9:
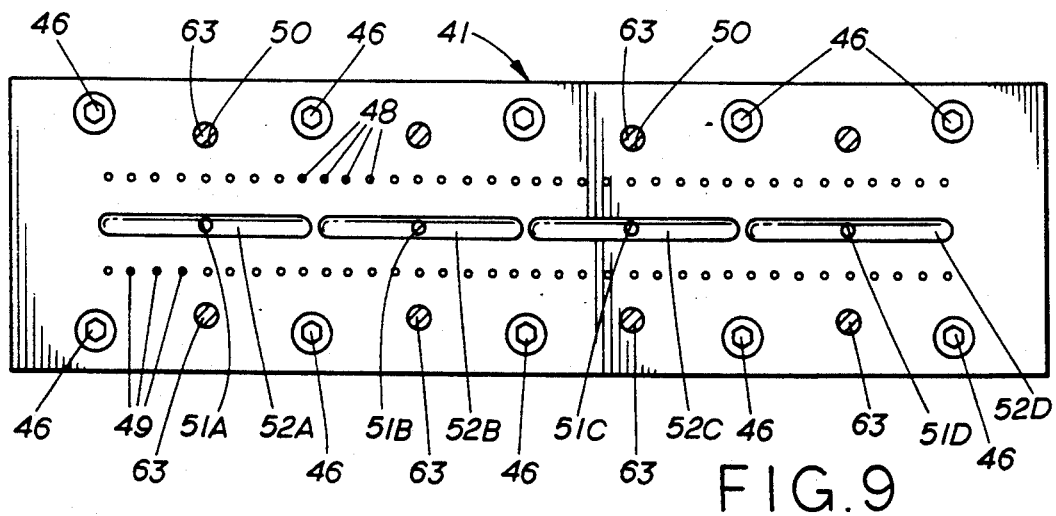
FIG. 9 is a sectional view of the die tip shown in FIG. 6 with the cutting plane taken along line 9—9 thereof.

Die Tip Assembly (FIGS. 6, 9, and 10)

The die tip assembly 13 is mounted to the underside of the die body 11 and covers air chamber 39. This assembly comprises a stack up of three members: a transfer plate 41, a die tip 42, and air plates 43 and 44. The transfer plate 41 extends substantially the full length of die body 11 and is secured thereto by bolts 46 through countersunk holes 47. Pairs of air holes 48 and 49 convergingly extend through the thickness of plate 41. The pairs of air holes 48 and 49 (as best seen in FIG. 9) are provided for each of the units 11A-11D. The inlets of air holes 48 and 49, communicate with the air chamber 39 on opposite sides of the row of inserts 28. As best seen in FIG. 6, each pair of holes 48 and 49 tapers convergingly inwardly toward one another.

A central polymer passage 51 is aligned with port 29 and polymer passage 24 of the die body 11. Formed in the lower surface of the plate 41 are longitudinal channels 52 (shown as 52A-52D in FIG. 9). Each channel 52 penetrates a short distance into the thickness of the transfer plate 41 and extends substantially the width of the unit but is separated from its adjacent channels. As shown in FIG. 9, the channels 52A-52D are longitudinally aligned and in combination extend substantially the entire length of the plate 41. The ends of channels 52 are preferably closely spaced apart so that the orifices spacing along the die tip are equally spaced substantially along its entire die tip length. Also formed is the transfer plate 41 are bolt holes 50 for securing the die tip 42 and air plates 43 and 44 as described below.

As best seen in FIG. 10, the die tip 42 comprises a tapered nose piece 53 of triangular cross section flanked by flanges 54. Returning to FIG. 6, the base 58 of die tip 42 opposite the nose piece 53 is substantially flat and is sized to fit on the exposed lower side of transfer plate 41. The tapered nosepiece 53 comprises tapered and intersecting surfaces 57a and 57b. A plurality of air passages 55 and 56 (FIG. 5) extend through the die tip 42. Each flow passage comprises portion 55a aligned with an air passage 48 of the plate 41 and portion 55b which discharges at a mid section of surface 57a and passage likewise comprises portion 56a aligned with a flow passage 49 of plate 41, and 56b discharging at a midsection on surface 57b.

The flat surface 58 of the die tip 42 has formed therein a plurality of channels 59 of the same size and shape as channels 52 of the transfer plate 41. The channels 59 and 52 form elongate polymer flow distribution chambers 60 for the orifices 61 as shown in FIGS. 2 and 5. Extending through the die tip 42 are a plurality of flow passages terminating in orifices 61.

The outlet of each air passage 55b or 56b forms an angle with its associated surface 57 or 58, respectively. The axis of the outlets of passages 55b or 55b define an angle (B) with surface 57a or 57b, of between 75° and 90°; preferably between 80° and 90°. Preferably the axes of passages 55b, 55a, 48, 49 56c, and 56b, fall in the same vertical plane. From about 5 to 20 pairs of air passages are provided for each unit chamber 60A-60D, or about 2 to 15 pairs per inch of die.

The flanges 54 of die tip 42 are provided with threaded holes 62 permitting the transfer plate 41 to be bolted thereto by bolts 63. Holes 64 formed in the flanges 54 permit the insertion of bolts 46 to secure the transfer plate 41 to body 11. The air plates 43 and 44 are provided with holes (not shown) aligned with holes 64 for the same purpose.

The air plates 43 and 44 are bolted to each side of the nose piece 42 by bolts 66 through countersunk holes 67 provided near the base of the nose piece 53. Flat portion 68 of each air plate 43 and 44 fits on the outer surface of each flange 54. Each plate 43 and 44 is secured to the flanges by bolts 63.

Each air plate 43 and 44 has a surface 69a or 69b tapered about the same angle as the taper of nose piece surfaces 57a or 57b. The bolts 66 extend angularly through holes 67 in plate 43 or 44 and screw into nose piece 53 securing the air plates 43 and 44 to the die tip 42. In assembled condition plate surface 69a abuts tapered surfaces 57a and plate surface 69b abuts tapered surface 57b. Threader holes are also provided on the underside of each plate 43 and 44 for receiving bolts 63.

Adjacent the flat surface 69a or 69b of each air plate 43 and 44 and positioned opposite the apex region of the nosepiece is a surface 71a and 71b spaced respectively from surface 57a for air plate 43 and surface 57b for air plate 44. Between surfaces 69a and 71a is a curved groove 72a which extends substantially the full length of the nosepiece 53. Likewise between surface 69b and 71b of plate 44 is a second groove 72b. Each groove 72a and 72b is aligned with air holes 55b or 56b respectively so that air discharging therefrom enters groove 72a or 72b.

The space between confronting surfaces 71a and 57a for air plate 43 and 71 and 57b for air plate 44 conducts air to each side of the row of orifices 61 generally in the form of converging sheets. This space referred to "air gap" typically ranges from 0.0007" to 0.020". The air plate edges 73a and 73b confront one another forming the air passage outlet 70. The set back of the edges 73a and 73b as measured axially along orifices 61 ranges from −0.020" to +0.020". The included angle A of the nose piece 53 at the apex ranges from 70 to 120, preferable 80° to 100° and most preferably 85° to 95°. The purpose of the grooves 72a and 72b is to balance the flow of air through the air gap. Each groove 72a, 72b should have a volume at least 5 times larger (preferably 5 to 20 times larger) than the volume between confronting surfaces 71a and 57a.

Valve Assembly (FIG. 5)

The valve assembly 12 imparts intermittent flow of polymer through the die body 11 and the die tip assembly 13 for each unit 11A-11D. Depending on the valve stem construction, the intermittent flow is off-on or pulsating which can be programmed to produce the desired web or adhesive pattern.

The mechanism for actuating the valve for either the on-off or pulse operations is the same and is shown in FIG. 5. The assembly, comprises a pneumatic valve actuator module 15, a stem 82, having a valve tip 83 designed to cooperate with valve seat 30 of insert 28. Each actuator module 15A-15D is bolted to the top surface of the die body 11 for its particular unit 11A-11D as shown in FIGS. 1 and 2.

The valve actuator module 15 comprises piston 81 which reciprocates within cylindrical chamber 84 defined by interconnected housing members 86 and 87. A fluid seal 88 is provided at the interface of members 86 and 87. The piston 81 comprises a metal disc 89 with raised or embossed surface 91, outer O-ring 92 sized to sealingly engage the walls of chamber 84, and a nut 93. A compression spring 94 interposed between disc 89 (encircling embossed surface 91) and the top of chamber 84 biases the piston 81 downwardly against the bottom surface of chamber 84.

Mounted on the top of housing member 86 is an elbow connector 96 connected to tubing 97. The elbow is in fluid communication with chamber 84 and serves to conduct air to and from chamber 84 above piston 81.

The lower housing member 87 has a side port 98 extending therethrough. Tubing 99 is connected to port 98 and serves to introduce and withdraw air from chamber 84 below piston 81.

The stem 82 has its upper end secured to nut 93 of piston 81 and extends donwwardly through hole 101 formed the bottom of housing member 87. A pair of opposed bushings 102 and 103 interconnect housing member 87 and die body 11. Bushing 102 is threaded to housing 87 as at 104 with fluid seal 106 provided therebetween. Bushing 103 is threaded to counterbore 27 with seal 107 provided therebetween. The bushings 102 and 103 have central openings 108 through which stem 82 is slidingly mounted. The assembly of housing members 86 and 87, and bushings 102 and 103 are maintained in stacked relation and secured to die body 11 by bolts 111. This modular construction permits the convenient installation and removal of the valve assembly modules 15.

In order to permit adjustment of the piston stroke within chamber 84, an adjustment knob 112 is provided. Knob 112 is threaded to a stationary portion 115 and is keyed to a rod 113 which passes through hole 114 in connector 96. The end of rod 83 engages surface 91. Turning the knob 112 in one direction moves the knob 112 and rod 113 upwardly increasing the length of the piston stroke. Turning the knob 112 in the other direction lowers the knob 112 and the rod 113 decreasing the length of the piston stroke.

The piston 81 is actuated by control valve which may be a solenoid, 4-way, two position valve 116 fed by air supply. Electrical controls 117 activates and deactivates solenoid of the control valve 116. To open the valve, the solenoid is energized causing air flow from control valve 116 through line 99 into chamber 84 below piston 81, while air in the upper chamber 84 exhausts through line 97 and valve 116. The piston 81 moves upwardly against spring 94 until piston surface 91 contacts rod 113.

In the normal deactivated position of the system, spring 94 forces piston 81 and stem 82 downwardly until stem tip 83 seats on valve seat 30 shutting off the polymer flow through port 29 to the die tip assembly 13. Energization of the control valve 116 causes the piston 81 and stem 82 to move upwardly opening port 29, permitting polymer to flow to die tip assembly 13.

Figures 12, 13, 14:
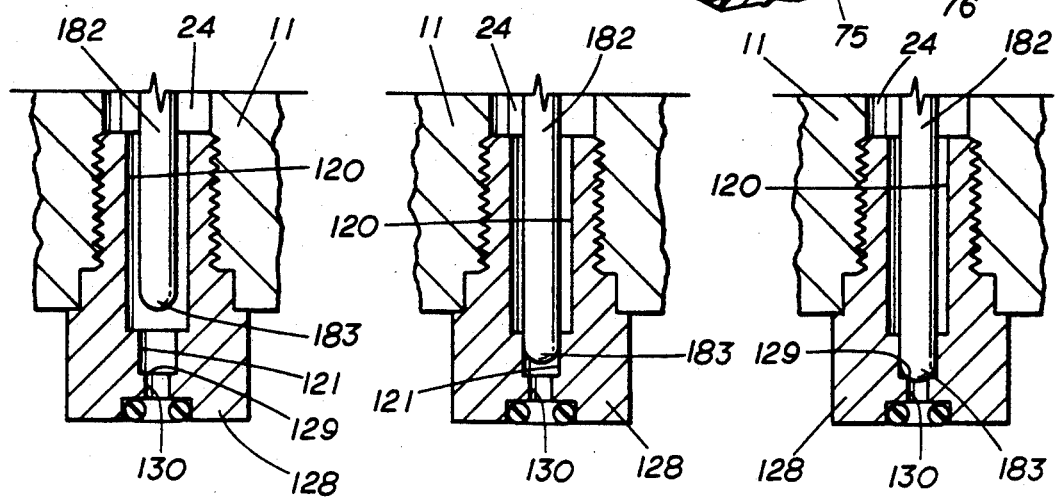
FIGS. 12-14 illustrates an alternate valve assembly useable in the intermittently operated meltblowing die.

In the valve assembly embodiment illustrated in FIG. 5, the valve stem closed port 29 thereby effecting on-off polymer flow. An alternate valve assembly is illustrated in FIGS. 12-14. In this embodiment, the valve insert 128 and the tip 183 of stem 182 (corresponding respectively to insert 28, seat 83, and stem 82) will be in the form shown in FIG. 12. The seat 128 has formed therein a large opening 120 which reduces to an intermediate cylindrically shaped opening 121 immediately above insert seat 129. Port 130 leads to transfer plate passage 51. The diameter of stem 182 is sized to fit in close conformity in opening 121, but allow reciprocal movement of the stem 182 into and out of opening 121. Clearances of 0.002" to 0.005" are satisfactory for most applications. In operation, the stem tip 183 with the valve open, is positioned in opening 120 as shown in FIG. 12. When it is desired to pulse flow through the die tip polymer flow passages of a particular unit, the valve actuator 15 of that unit is energized causing the stem tip 183 to pass through opening 121 until stem tip 183 seats or nearly seats on seat 129. Thus the stem tip 183 acts as a plunger within cylinder 121 forcing polymer through port 130. This action is fast and thus produces a pressure surge or pulse to clear any polymer flow passages or die tip orifices. The stroke of stem tip 183 may vary, but generally will be about 0.2 inches. The plunger action increases polymer flow through the cylinder 121 by at least 5 times normal flow, and preferably 10 to 500 times, and most preferably 20 to 100 times.

Figure 11:
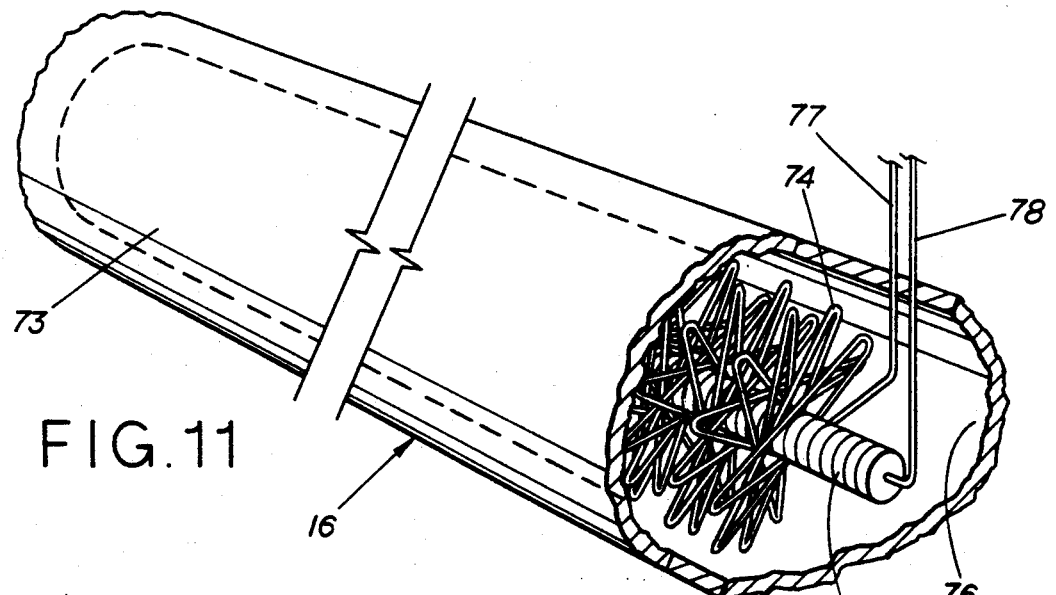
FIG. 11 is a perspective view of a heater useably in the assembly shown in FIGS. 1 and 3 with portions cut away to illustrate internal parts.

Air Heater (FIG. 11)

An inline electrical heater 16 is secured directly to the manifold 22, by short nipple 118 (as shown in FIG. 3). Air ambient temperatures from line 14 flows through the heater 16 where it is heated to a temperature ranging from 300° to 1000° F. at pressure drops of 1 to 20 psi at normal air flow rates (0.5 to 30 SCFM per inch of die length (e.g. length of the row or orifices 61).

As shown in FIG. 11, the heater 16 comprises a casing 73 and serpentine heater elements 74. The elements 74 are continuous and are mounted on a core 75 of insulator material such as ceramics. The core 25 extends axially in casing 73 and has a diameter of 0.1 to 0.3 of the inside diameter of the housing. The interior of casing 73 is preferably provided with an insulated liner 76. The inside diameter of the housing ranges from $\frac{1}{4}$ to 3" with $\frac{1}{2}$ to 3" being preferred.

The core 75 is ribbed or of spiral shape to maintain the elements 74 axially spaced apart. The elements 74 are continuous serpentine coils extending radially outwardly from the core 75 and have their outer tips spaced a short distance from the inside wall 76. The coil 75 is in the form of outwardly extending thin loops from the core 75 with each loop being angularly offset from its adjacent loops. The angular displacement may vary widely but from 10° to 45° is satisfactory. The ratio of the major axis of each loop extend radially outwardly and is 2 to 5 times larger than the minor axis of each loop. Electric conductor 77 connects the coils 74 to a power source (220 VAC) and the return lead 78 may be through the core 75 and connected to the power source. Loop spacings of 0.02 to 0.25 per linear inch of the core are normally used. The electrical coils 74 may be made of tungsten, having a diameter of 0.010" to 0.080". An in-line heater useable in the present invention are manufactured by Sylvania GTE Co. In order to minimize heat losses, it is preferred that the heater 16 be mounted directly on the die assembly or within 12 inches, preferable 6 inches, therefrom.

Operation

The components of the die assembly 10 are assembled as illustrated in FIG. 3. The die tip 13 is secured to the die body 11 and the valve actuator adjusted to provide the desired stroke. The controls are set to program the valve actuators 15 thereby producing the desired pattern.

As indicated above, the die assembly 10 may be used in meltblowing adhesives, spray coating resins, and web forming resins. The adhesives include EVA's (e.g. 20–40 wt % VA). These polymers generally have lower viscosities than those used in meltblown webs. Conventional hot melt adhesives useable include those disclosed in U.S. Pat. Nos. 4,497,941, 4,325,853, and 4,315,842, the disclosures of which are incorporated herein by reference. The above melt adhesives are by way of illustration only; other melt adhesives may also be used.

The typical meltblowing web forming resins include a wide range of polyolefins such as propylene and ethylene homopolymers and copolymers. Specific thermoplastics includes ethylene acrylic copolymers, nylon, polyamides, polyesters, polystyrene, poly(methyl methacrylate), polytrifluoro-chloroethylene, polyurethanes, polycarbonates, silicone sulfide, and poly(ethylene terephthalate), pitch, and blends of the above. The preferred resin is polypropylene. The above list is not intended to be limiting, as new and improved meltblowing thermoplastic resins continue to be developed.

Polymers used in coating may be the same used in melt blowing webs but at somewhat lower viscosities. Meltblowing resins for a particular application can readily be selected by those skilled in the art.

In meltblowing resins to form webs and composites, the die assembly 10 is connected to a conventional extruder or polymer melt delivery system such as that disclosed in U.S. Pat. No. 5,061,170, the disclosure of which is incorporated herein by reference. With either system, a polymer by-pass circuit should be provided for intermittent operation.

The number of units in each die assembly 10 will depend on the application. The system shown in FIG. 1 comprises nine units for applying adhesive to a diaper backsheet in the pattern shown in FIG. 4. The adhesives used in the experiment was pressure sensitive adhesive. As best seen in FIGS. 1 and 3, the diaper backsheet (substrate 19) is fed onto a conveyor roller and passes under the die assembly 10. The assembly was operated at polymer temperatures of 300° F. and air temperature 325° F. By intermittent operation of the various units, the adhesive pattern of FIG. 4 is obtained.

Initially, all of the units are operated with valves open. As the sheet 19 approaches the diaper leg cut away areas 122 and 123, the outer two modules on each side of the row of modules are actuated closing the polymer flow valves of their corresponding units. Polymer flow is interrupted in areas 122 and 123 while polymer continues in the central region 124. Note that the die is constructed to leave strips 125 and 126 blank. At the end of cutaway regions 122 and 123, operation of all units is resumed. At the end of the diaper, all valves are shut off for a short period of time to leave a space between that diaper and the next one. The die assembly manufactured 400 diapers per minute. A diaper sheet is applied to the adhesives.

In another embodiment, the units of the die assembly 10 are provided with pulsating valves (FIGS. 12-14) to ensure polymer passage cleanup. An experiment using a meltblowing polymer (PP,MFR of 35) to form a web was carried out.

A total of 8 units were used providing a die width of 12". The die assembly was operated at 300° F. (polymer) and 325° F. (air). The polymer and air flow rates were 100 grams per minute and 1 SCFM per inch of die. The die assembly produced a web having a web of 3 grams per m² basis weight. During operation, an orifice became plugged with polymer residue. The actuator of the problem unit was manually actuated sending a polymer flow surge through the orifices by operation of the valve shown in FIG. 12. The single pulse unplugged the orifice.

| | Broad Range | Preferred Range | Best Mode |
|---|---|---|---|
| Die Assembly | | | |
| Number of units | 1-50 | 2-40 | 2-20 |
| Length of units (inches) | 1-10 | 1-5 | 1.5 |
| Orifice (61) diameter (inches) | .010-.080 | .010-.040 | .015 |
| -continued | | | |
| | Broad Range | Preferred Range | Best Mode |
| Orifice/inch: | | | |
| Polymer (MB) | 10-50 | 15-40 | 20-30 |
| Adhesives | 5-40 | 10-30 | 12-20 |
| Air Holes (55,56) Diameter (inches) | .020-.080 | .040-.070 | .059 |
| Balancing groove (72) volume (cc/inch) | .005-.5 | .05-.015 | .09 |

An important feature of the die assembly constructed according to the present invention is the intermittent operation. To minimize polymer after flow with the valve shut, it is preferred that the volume between the valve seat and the orifice discharge be 0.3 cc per inch of die, preferably between 0.2 to 0.3 cc per inch.

Alternative Uses

The die assembly 10 constructed according to the present invention as demonstrated by the above examples is quite versatile. In addition to the meltblowing of adhesives for diapers and manufacture of webs, the die assembly can meltblow undercoating polymers onto metals, it can meltblow composites layer(s) in a selected pattern onto a substrate; it can meltblow adhesives into or onto nonwovens (e.g. spunbond fibers) to bond the fibers together; it can meltblow polymer additives onto or into other nonwoven materials; it can also employ different resins in each unit by merely using different polymer feed system into die inlet passages 23. Other uses will occur to those skilled in the art.

Summary

The meltblowing die assembly 10 constructed to the present invention embodies the following features:
 (a) intermittent polymer flow;
 (b) a plurality of separate side-by-side units;
 (c) internal valves with modular actuators;
 (d) air flow passages in the die tip providing simplified construction; and
 (e) an air heater connected to the die.

What is claimed is:

1. A meltblowing die assembly comprising
 (a) a die body having a polymer flow passage formed therein;
 (b) a meltblowing die secured to the die body and comprising (i) a die tip having a nosepiece terminating in an elongate apex, (ii) a plurality of orifices formed in the nosepiece, (iii) air plates mounted on the die tip and in combination with the nosepiece defining converging air channels which meet at the apex, and (iv) means for conducting polymer from the die body flow passage to the orifices;
 (c) a valve mounted in the polymer flow passage and comprising (i) a valve insert having a port formed therein and disposed in the polymer flow passage, (ii) a cylindrical opening immediately upstream of said port, and (iii) a stem extending into said polymer flow passage and having one end shaped to fit in close conformity in said cylindrical opening and seat on said port and an opposite end positioned outside of said polymer flow passage; and
 (d) means operative on said opposite end of the stem for moving said stem between a closed position and an open position in relation to said port whereby movement to the closed position causes said one end of the stem to enter the cylindrical opening creating a fluid surge through the port and the orifices downstream thereof.

2. A meltblowing die comprising
(a) a die body having a mounting surface and plurality of separate polymer flow passages formed side-by-side therein in spaced apart relation, each flow passage having (i) an inlet and (ii) a circular outlet formed in the mounting surface of the die body, said outlets having axes which lie in the same plane;
(b) a die tip assembly having
  (i) a base mounted on said mounting surface and having formed therein a plurality of elongate polymer header channels arranged in end-to-end relation, said base further including means for conducting polymer from each outlet through an associated die base polymer flow passage to an associated one of the header channels;
  (ii) a die tip having a nosepiece extending outwardly from said base and terminating in an elongate apex and having polymer orifices arranged in side-by-side relation along the apex, and means interconnecting each polymer header channel with a longitudinal portion of the orifices; and
  (iii) air plates mounted on the die tip and having surfaces which in combination with the nosepiece define converging air channels which meet at the apex of the nosepiece;
(c) means for delivering a polymer melt to each inlet of the die body whereby the polymer melt flows through the die in parallel side-by-streams comprising a polymer flow passage, a header channel and a longitudinal portion of the orifices;
(d) a valve seat mounted in each die body polymer flow passage outlet; and
(e) a valve actuator assembly for each valve seat and including (i) a valve actuator mounted on the die body, (ii) a valve stem having one end connected to the valve actuator and the opposite end adapted to seat on the valve seat, and (iii) means for activating the valve actuator to selectively move the valve stem to an open or closed position on the valve seat.

3. A die assembly comprising
(a) a die body having (i) a mounting surface, and (ii) first and second polymer flow passages extending through the die body and having first and second circular outlets formed in the mounting surface at spaced locations;
(b) a die tip having (i) a base mounted on the die body mounting surface and being coextensive therewith, (ii) a triangular nosepiece extending outwardly from the base and terminating in an apex which extends parallel to the plane of the mounting surface, (iii) air plates mounted on opposite sides of the nosepiece and therewith defining converging air channels which discharge at the apex, (iv) first and second header channels formed in the base and arranged in end-to-end relationship and extending parallel to said apex, (v) first and second conduits formed in the base for conducting polymer melt from the first and second polymer flow passage outlets to the first and second header channels, respectively, and (vi) first and second groups of orifices, formed along the apex and, respectively, being in fluid communication with the first and second header channels, each of said first and second groups of orifices extending from 1 to 5 inches along the apex;
(c) first and second valves mounted at the first and second polymer flow passage outlets, respectively, the fluid volume between the first and second valve and the discharge of the first and second groups of orifices being not greater than 0.3 cc per inch of the apex, respectively; and
(d) means for opening and closing the first and second valves.

4. The die assembly as defined in claim 3 wherein the orifices along the apex are uniformly spaced at from 5 to 40 orifices per inch.

5. The meltblowing die as defined in claim 3 wherein each header channel feeds from 10 to 500 orifices, said orifices being spaced along said apex at a spacing of from 10 to 50 orifices per inch.